MULTIPLE CONVOLUTION VACUUM TANK FOR TAPE TRANSPORTS

Filed Aug. 5, 1963

United States Patent Office 3,206,132

Patented Sept. 14, 1965

3,206,132
MULTIPLE CONVOLUTION VACUUM TANK FOR TAPE TRANSPORTS

Willis E. Libby, Huntington, N.Y., assignor to Potter Instrument Company, Inc., Plainview, N.Y., a corporation of New York Filed Aug. 5, 1963, Ser. No. 299,802
5 Claims. (Cl. 242—55.12)

This invention relates to tape transports and, more particularly, relates to an improved tape transport utilizing dual slack loop vacuum chambers to obtain improved slack loop control within limited space.

Tape transport mechanisms using slack loops are of course known. In such mechanisms, the slack loop of tape increases or decreases in size to compensate for temporary differences in speed of tape transport past a head and the transport provided by the feed and takeup reels. The slack loop is usually maintained by a vacuum chamber to provide proper tape tension despite change in loop size. In many such systems, the desired slack loop size is large, resulting in excessive panel sizes merely for the slack loop.

It is an object of this invention to provide a tape transport which is provided with a long slack loop within limited space.

Other objects and advantages of this invention will be pointed out hereinafter in the following detailed description of the invention, which may best be understood by reference to the accompanying drawings, of which:

Figure 1:
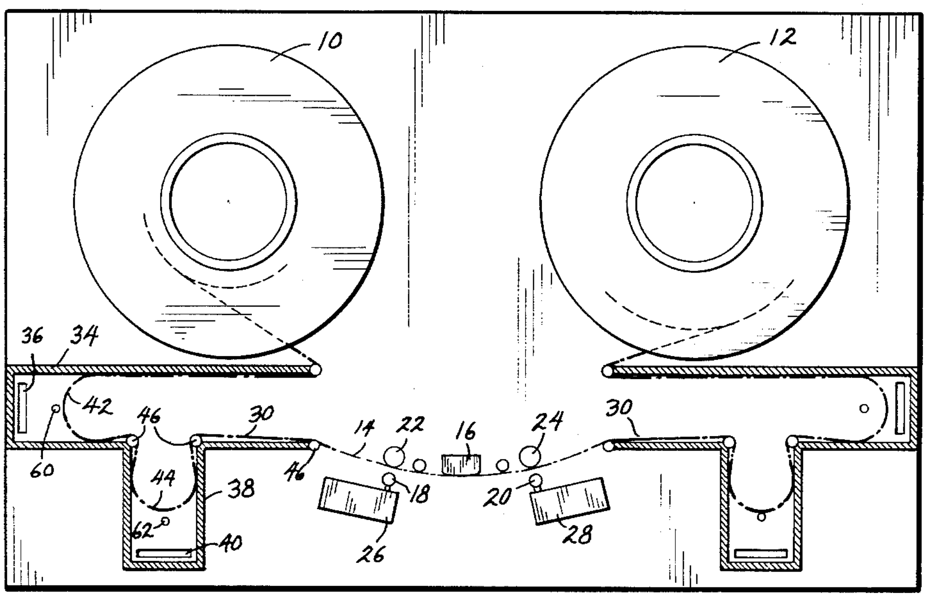
FIG. 1 is a partially sectioned view of a tape transport system in accordance with the present invention.
Figure 2:
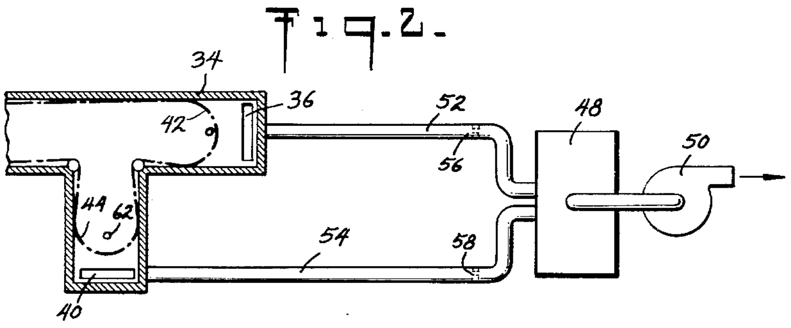
FIG. 2 is a partially sectioned view of a portion of the apparatus shown in FIG. 1 illustrating the evacuation of the slack loop chambers.

In the figures, there is shown a tape transport comprising a first and second tape reel 10 and 12 respectively on each of which a portion of tape 14 is wound. The tape 14 is driven past a transducer head 16 by the action of pinch rolls 18 and 20 which are moved into gripping engagement with tape 14 against a drive rolls 22 and 24 respectively by the action of the mechanisms 26 and 28 respectively. Drive rolls 22 and 24 are rotatably driven in opposite directions thereby to rapidly reverse the tape movement past head 16. The rapid changes in tape speed and direction are required by the application. Since the tape length between rolls 18 and 20 has very little inertia, acceleration of this tape length is feasible. However, the storage reels 10 and 12 cannot be accelerated to take up and feed the tape directly into the drive rolls 22 and 24.

The lag in take up by the driven reels or spools 10 and 12 is taken up by a slack loop 30 positioned on each side of the drive assembly. To maintain each slack loop, there is provided a central vacuum chamber 34 having an open end of rectangular configuration, the width of which is approximately equal to the width of the tape 14. A vacuum port 36 is provided in the side wall of such chamber.

A second vacuum chamber 38 is provided, the end of which enters the side wall of chamber 34 and which is provided with a vacuum port 40 in the side wall thereof. The slack loop 30 is, thus, made up of loops 42 and 44 drawn respectively into chambers 34 and 38. In conventional manner, idler rollers 46 may be provided at the entrances to each of said chambers.

Chambers 34 and 38 are evacuated by coupling the ports 36 and 40 respectively to a plenum chamber 48 evacuated by pump 50 through pipe couplings 52 and 54 respectively. Restrictions 56 and 58 are provided within pipe 52 and 54 to isolate the chambers permitting use of a single vacuum pump 50 and plenum chamber 48.

By the use of vacuum chamber 34 having a side branch 38, the slack loop 30 can be considerably longer that with conventional systems without, however, increasing the size of the panel. To provide proper control of the drives for the spools 10 and 12, it is desirable to arrange the chambers so that they fill and empty in sequential fashion. This is accomplished by providing different differential pressures across the tapes in the respective chambers. One convenient arrangement for this result is to make chamber 38 smaller than chamber 34. Alternatively, the evacuation in the chambers can differ.

Sensors 60 and 62 can then be positioned within chambers 34 and 38 respectively to provide an unambiguous indication for control of the drive of reels 10 and 12. The sensors 60 and 62 may conveniently be any of the sensors typically used in such applications, such as vacuum switches or photoelectric pickoffs, to detect the passage of loops and to provide an output signal on such passage. As the tape is stored, sensor 60 will trip when slightly less than half of the maximum of tape is stored and sensor 62 will be tripped when slightly more than half of the maximum length of tape is stored, since tape will be stored first in chamber 34 and then in chamber 38. Similarly, as tape is withdrawn, it will be pulled from chamber 38 first, tripping pickoff 62 (see FIG. 3) and then be pulled from chamber 38.

Thus, since the chambers are so dimensioned as to provide that the side branch empty first and fill last, the unambiguous servo control signals can be generated for control of the tape reel drives for reels 10 and 12. Such drives are not shown since they are conventional.

Figure 3:
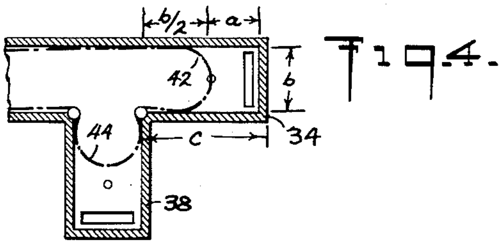
FIGS. 3 and 4 are section views of a portion of the apparatus shown in FIG. 1 in different stages of operation.
Figure 4:
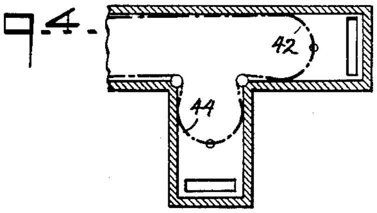

In FIG. 3, it is shown that the location of the chamber 38 relative to the closed end of the chamber 34 is critical. The dimension $c$ must be at least equal to the radius $b/2$ of the loop plus a constant $a$ equal to a selected minimum distance to keep the loop end from the closed end of the chamber 34.

The vacuum chambers are provided with bleed holes (not shown) in the chamber walls to prevent electrostatic clinging of the tape.

This invention may be variously modified and embodied within the scope of the subjoined claims.

What is claimed is:

1. A tape transport comprising a first and second tape storage reel, a transducer head, a length of tape wound on both of said reels and extending past said head, means for driving said tape past said transducer head in either direction, at least one slack loop system positioned between said tape driving means and one of said tape storage reels, said slack loop system comprising a first vacuum chamber of rectangular section and having an open end over which said tape passes, the width of said opening being approximately equal to the width of said tape, means for evacuating said chamber, a second vacuum chamber having an open end opening into the side wall of said first vacuum chamber and spaced from the bottom of said first vacuum chamber a predetermined distance so that a loop of said tape will extend to said evacuating means in said first chamber before a loop developes in said second chamber, means for evacuating said second chamber, means for detecting the positioning of the loops within each of said chambers and for effecting drive of said reels in accordance therewith.

2. A tape transport in accordance with claim 1 in which said detecting means comprises a first tape position detector in said second chamber, and means for providing a different differential pressure across the tape extending into said first chamber as across the tape extending into said second chamber.

3. A tape transport in accordance with claim 2 in which said pressure providing means comprises dimensioning the cross sectional area of the open end of said first chamber larger than the cross sectional area of said second chamber and a single vacuum source coupled to each of said chambers.

4. A slack loop control arrangement for magnetic tape comprising a first vacuum chamber of rectangular cross section, said chamber having an open end to receive said tape and a vacuum port in the side wall adjacent the closed end of said chamber, a second vacuum chamber of rectangular cross section, said second chamber having an open end positioned in tape receiving relationship in the wall of said first chamber, said second chamber having a vacuum port in the side wall adjacent the closed end of said chamber but spaced therefrom by a distance which is at least equal to the radius of a tape loop plus a selected constant so that a loop of tape will extend to said vacuum port in said first chamber before a loop developes in said second chamber, and a source of vacuum coupled to each of said vacuum ports.

5. A slack loop control arrangement for magnetic tape as set forth in claim 1 wherein the cross sectional area of said second chamber is smaller than that of said first chamber.

References Cited by the Examiner

UNITED STATES PATENTS

| | | | |
|---|---|---|---|
| 2,980,355 | 4/61 | Cannings | 242—55.12 |
| 3,112,473 | 11/63 | Wicklund et al. | 242—55.12 X |

MERVIN STEIN, *Primary Examiner.*